United States Patent
Cao et al.

(10) Patent No.: US 10,139,500 B2
(45) Date of Patent: Nov. 27, 2018

(54) SEMICONDUCTOR X-RAY DETECTOR CAPABLE OF DARK CURRENT CORRECTION

(71) Applicant: SHENZHEN XPECTVISION TECHNOLOGY CO., LTD., Shenzhen (CN)

(72) Inventors: Peiyan Cao, Shenzhen (CN); Huabin Cheng, Shenzhen (CN)

(73) Assignee: SHENZHEN XPECTVISION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/742,255

(22) PCT Filed: Oct. 14, 2015

(86) PCT No.: PCT/CN2015/091943
§ 371 (c)(1),
(2) Date: Jan. 5, 2018

(87) PCT Pub. No.: WO2017/063159
PCT Pub. Date: Apr. 20, 2017

(65) Prior Publication Data
US 2018/0210097 A1    Jul. 26, 2018

(51) Int. Cl.
*G01T 1/24* (2006.01)
*G01T 1/20* (2006.01)

(52) U.S. Cl.
CPC ............ *G01T 1/247* (2013.01); *G01T 1/2018* (2013.01)

(58) Field of Classification Search
CPC .......... H04N 5/361; G01J 3/50; G01T 1/2018; G01T 1/247; G01T 1/1615; G01T 1/2985; G01T 1/18; G01T 1/241
USPC ...................................... 250/370.09
See application file for complete search history.

(56) References Cited

U.S. PATENT DOCUMENTS

| | | | |
|---|---|---|---|
| 6,921,200 B1 * | 7/2005 | Booysen | A61B 6/4482 378/196 |
| 2003/0169847 A1 * | 9/2003 | Karellas | A61B 6/481 378/98.3 |
| 2006/0180768 A1 | 8/2006 | Bogdanovich et al. | |
| 2008/0165921 A1 | 7/2008 | Tkaczyk et al. | |
| 2010/0245378 A1 | 9/2010 | Matsuura | |
| 2011/0079729 A1 * | 4/2011 | Partain | G01T 1/24 250/370.09 |
| 2012/0140882 A1 * | 6/2012 | Iwakiri | A61B 6/4233 378/62 |

(Continued)

FOREIGN PATENT DOCUMENTS

CN    102193102 A    9/2011

*Primary Examiner* — Taeho Jo
(74) *Attorney, Agent, or Firm* — Na Xu; Qian Gu; IPro, PLLC

(57) ABSTRACT

Disclosed herein is a method to measure an intensity distribution of X-ray using an X-ray detector, the method comprising: determining values of dark current at at least three locations on the X-ray detector, wherein the three locations are not on a straight line; determining a spatial variation of absorptance of the X-ray using the values of the dark current; measuring an apparent intensity distribution of the X-ray; determining the intensity distribution by removing a contribution of the spatial variation the absorptance from the apparent intensity distribution.

3 Claims, 25 Drawing Sheets

(56) References Cited

U.S. PATENT DOCUMENTS

2014/0332668 A1\* 11/2014 Nishihara ............... H04N 5/32
250/208.1

\* cited by examiner

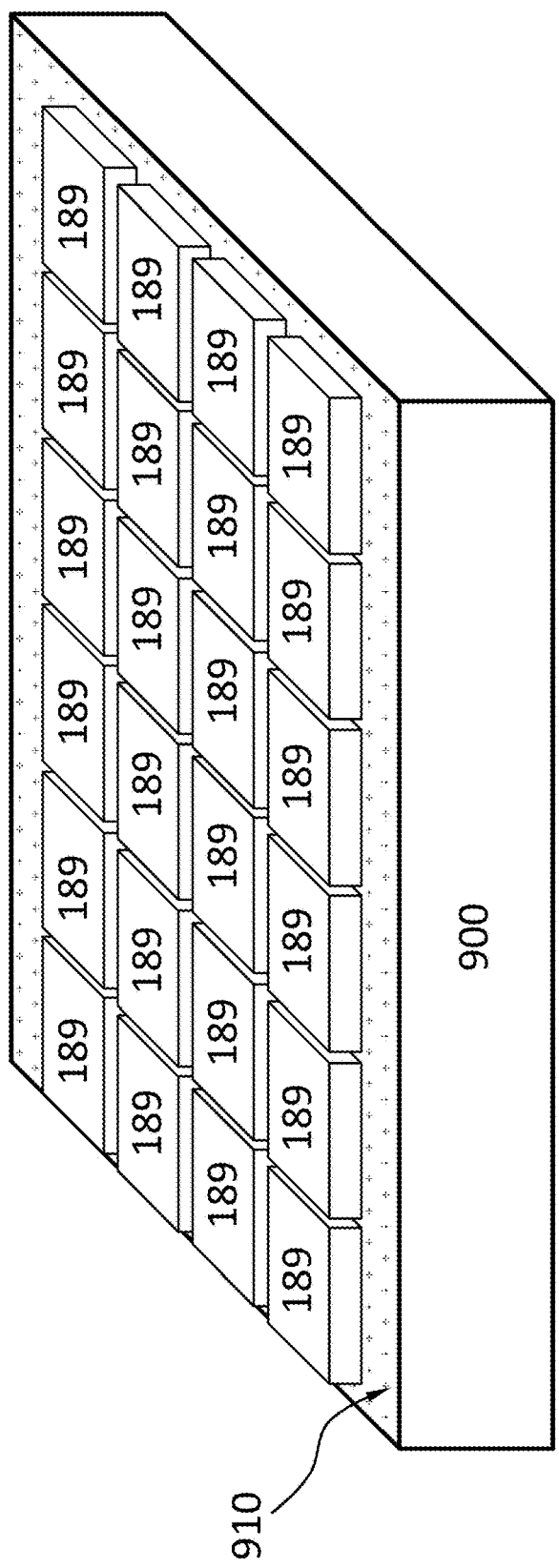

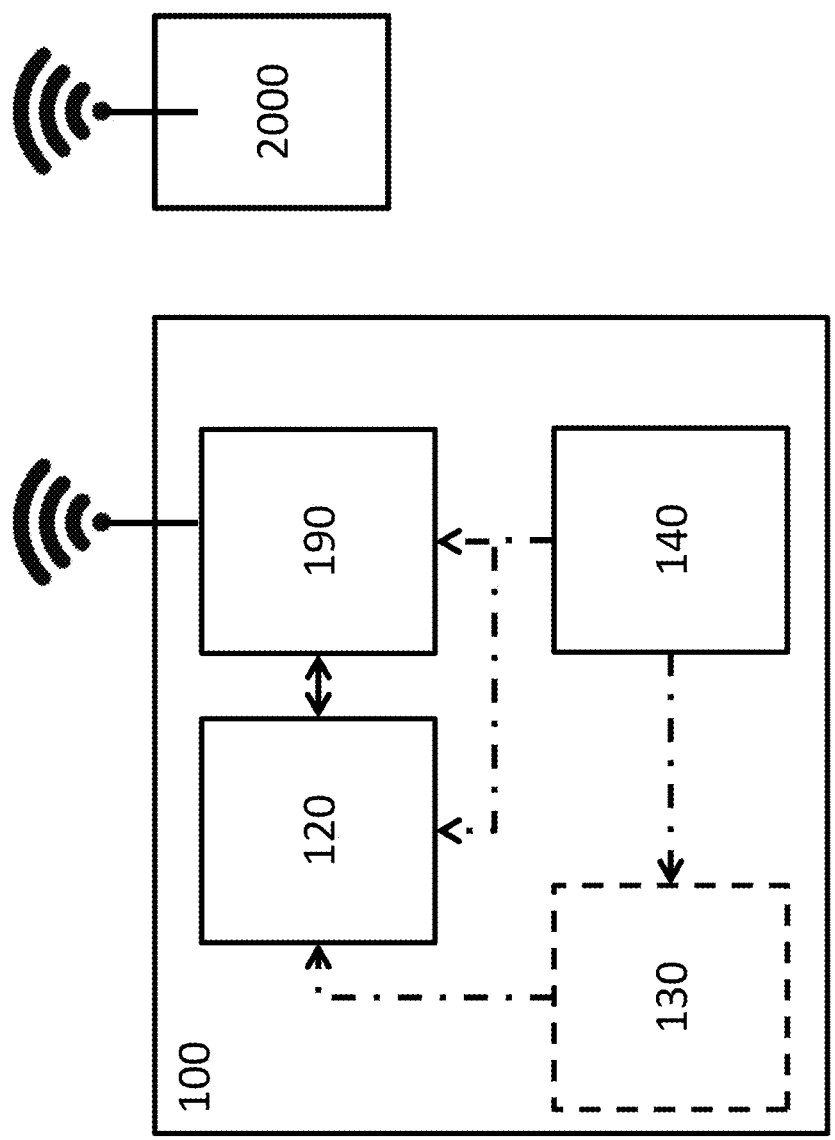

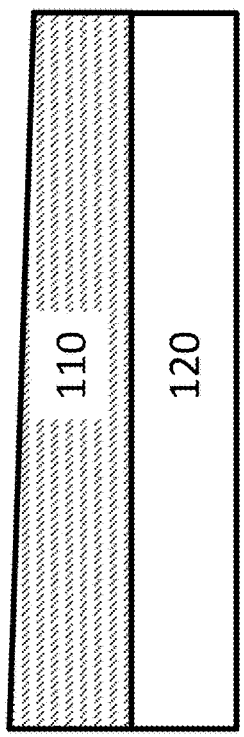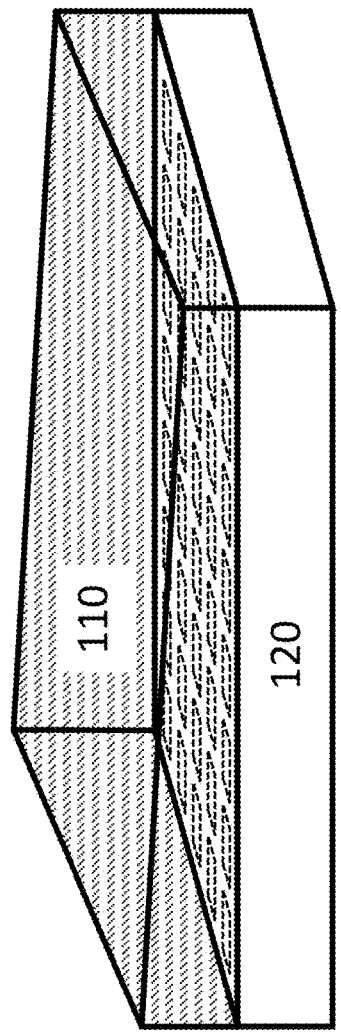
Fig. 6A
Fig. 6B

SEMICONDUCTOR X-RAY DETECTOR CAPABLE OF DARK CURRENT CORRECTION

TECHNICAL FIELD

The disclosure herein relates to X-ray detectors, particularly relates to semiconductor X-ray detectors capable of dark current correction.

BACKGROUND

X-ray detectors may be devices used to measure the flux, spatial distribution, spectrum or other properties of X-rays.

X-ray detectors may be used for many applications. One important application is imaging. X-ray imaging is a radiography technique and can be used to reveal the internal structure of a non-uniformly composed and opaque object such as the human body.

Early X-ray detectors for imaging include photographic plates and photographic films. A photographic plate may be a glass plate with a coating of light-sensitive emulsion. Although photographic plates were replaced by photographic films, they may still be used in special situations due to the superior quality they offer and their extreme stability. A photographic film may be a plastic film (e.g., a strip or sheet) with a coating of light-sensitive emulsion.

In the 1980s, photostimulable phosphor plates (PSP plates) became available. A PSP plate may contain a phosphor material with color centers in its lattice. When the PSP plate is exposed to X-ray, electrons excited by X-ray are trapped in the color centers until they are stimulated by a laser beam scanning over the plate surface. As the plate is scanned by laser, trapped excited electrons give off light, which is collected by a photomultiplier tube. The collected light is converted into a digital image. In contrast to photographic plates and photographic films, PSP plates can be reused.

Another kind of X-ray detectors are X-ray image intensifiers. Components of an X-ray image intensifier are usually sealed in a vacuum. In contrast to photographic plates, photographic films, and PSP plates, X-ray image intensifiers may produce real-time images, i.e., do not require post-exposure processing to produce images. X-ray first hits an input phosphor (e.g., cesium iodide) and is converted to visible light. The visible light then hits a photocathode (e.g., a thin metal layer containing cesium and antimony compounds) and causes emission of electrons. The number of emitted electrons is proportional to the intensity of the incident X-ray. The emitted electrons are projected, through electron optics, onto an output phosphor and cause the output phosphor to produce a visible-light image.

Scintillators operate somewhat similarly to X-ray image intensifiers in that scintillators (e.g., sodium iodide) absorb X-ray and emit visible light, which can then be detected by a suitable image sensor for visible light. In scintillators, the visible light spreads and scatters in all directions and thus reduces spatial resolution. Reducing the scintillator thickness helps to improve the spatial resolution but also reduces absorption of X-ray. A scintillator thus has to strike a compromise between absorption efficiency and resolution.

Semiconductor X-ray detectors largely overcome this problem by direct conversion of X-ray into electric signals. A semiconductor X-ray detector may include a semiconductor layer that absorbs X-ray in wavelengths of interest. When an X-ray photon is absorbed in the semiconductor layer, multiple charge carriers (e.g., electrons and holes) are generated and swept under an electric field towards electrical contacts on the semiconductor layer. Cumbersome heat management required in currently available semiconductor X-ray detectors (e.g., Medipix) can make a detector with a large area and a large number of pixels difficult or impossible to produce.

SUMMARY

Disclosed herein is a method to measure an intensity distribution of X-ray using an X-ray detector, the method comprising: determining values of dark current at at least three locations on the X-ray detector, wherein the three locations are not on a straight line; determining a spatial variation of absorptance of the X-ray using the values of the dark current; measuring an apparent intensity distribution of the X-ray; determining the intensity distribution by removing a contribution of the spatial variation the absorptance from the apparent intensity distribution.

According to an embodiment, determining values of the dark current is at three pixels of the X-ray detector.

According to an embodiment, the spatial variation of absorptance is linear with respect to location.

According to an embodiment, the spatial variation of absorptance is caused by thickness variation of an X-ray absorption layer of the X-ray detector.

Disclosed herein is an X-ray detector, comprising an X-ray absorption layer, an electronic layer configured to detect X-ray photons absorbed by the X-ray absorption layer, a communication module, wherein the communication module is configured to communicate with a computer.

According to an embodiment, the communication module is configured to communicate with a computer via a universal serial bus (USB).

According to an embodiment, the communication module is configured to communicate with a computer wirelessly.

According to an embodiment, the X-ray detector further comprises a battery configured to power the electronic layer and the communication module.

According to an embodiment, the X-ray detector further comprises a high voltage circuit configured to provide a voltage to the X-ray absorption layer.

BRIEF DESCRIPTION OF FIGURES

FIGS. 4A-4E schematically show a flow of making the detector, according to an embodiment.

FIG. 5C schematically shows a function block diagram of the electronics of the detector, according to an embodiment.

FIG. 6A and FIG. 6B schematically show that the thickness of the X-ray absorption layer may not be entirely uniform.

DETAILED DESCRIPTION

Figure 1A:
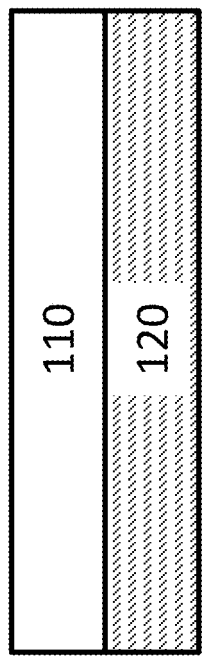
FIG. 1A schematically shows a cross-sectional view of the detector, according to an embodiment.

FIG. 1A schematically shows a cross-sectional view of the detector 100, according to an embodiment. The detector 100 may include an X-ray absorption layer 110 and an electronics layer 120 (e.g., an ASIC) for processing or analyzing electrical signals incident X-ray generates in the X-ray absorption layer 110. In an embodiment, the detector 100 does not comprise a scintillator. The X-ray absorption layer 110 may include a semiconductor material such as, silicon, germanium, GaAs, CdTe, CdZnTe, or a combination thereof. The semiconductor may have a high mass attenuation coefficient for the X-ray energy of interest.

Figure 1B:
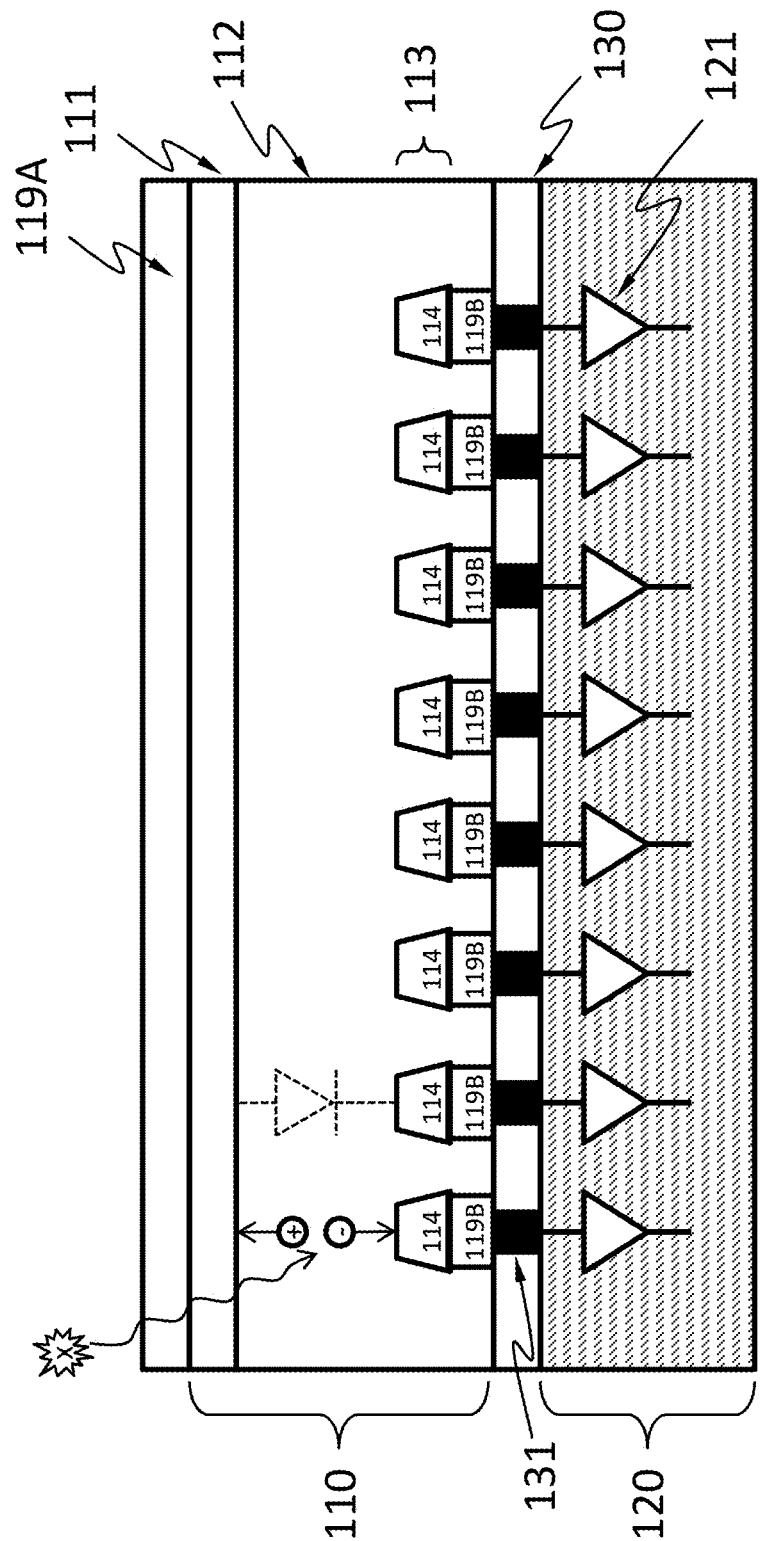
FIG. 1B schematically shows a detailed cross-sectional view of the detector, according to an embodiment.

As shown in a detailed cross-sectional view of the detector 100 in FIG. 1B, according to an embodiment, the X-ray absorption layer 110 may include one or more diodes (e.g., p-i-n or p-n) formed by a first doped region 111, one or more discrete regions 114 of a second doped region 113. The second doped region 113 may be separated from the first doped region 111 by an optional the intrinsic region 112. The discrete portions 114 are separated from one another by the first doped region 111 or the intrinsic region 112. The first doped region 111 and the second doped region 113 have opposite types of doping (e.g., region 111 is p-type and region 113 is n-type, or region 111 is n-type and region 113 is p-type). In the example in FIG. 1B, each of the discrete regions 114 of the second doped region 113 forms a diode with the first doped region 111 and the optional intrinsic region 112. Namely, in the example in FIG. 1B, the X-ray absorption layer 110 has a plurality of diodes having the first doped region 111 as a shared electrode. The first doped region 111 may also have discrete portions.

When an X-ray photon hits the X-ray absorption layer 110 including diodes, the X-ray photon may be absorbed and generate one or more charge carriers by a number of mechanisms. An X-ray photon may generate 10 to 100000 charge carriers. The charge carriers may drift to the electrodes of one of the diodes under an electric field. The field may be an external electric field. The electrical contact 119B may include discrete portions each of which is in electrical contact with the discrete regions 114. In an embodiment, the charge carriers may drift in directions such that the charge carriers generated by a single X-ray photon are not substantially shared by two different discrete regions 114 ("not substantially shared" here means less than 2%, less than 0.5%, less than 0.1%, or less than 0.01% of these charge carriers flow to a different one of the discrete regions 114 than the rest of the charge carriers). Charge carriers generated by an X-ray photon incident around the footprint of one of these discrete regions 114 are not substantially shared with another of these discrete regions 114. A pixel 150 associated with a discrete region 114 may be an area around the discrete region 114 in which substantially all (more than 98%, more than 99.5%, more than 99.9%, or more than 99.99% of) charge carriers generated by an X-ray photon incident therein flow to the discrete region 114. Namely, less than 2%, less than 1%, less than 0.1%, or less than 0.01% of these charge carriers flow beyond the pixel.

Figure 1C:
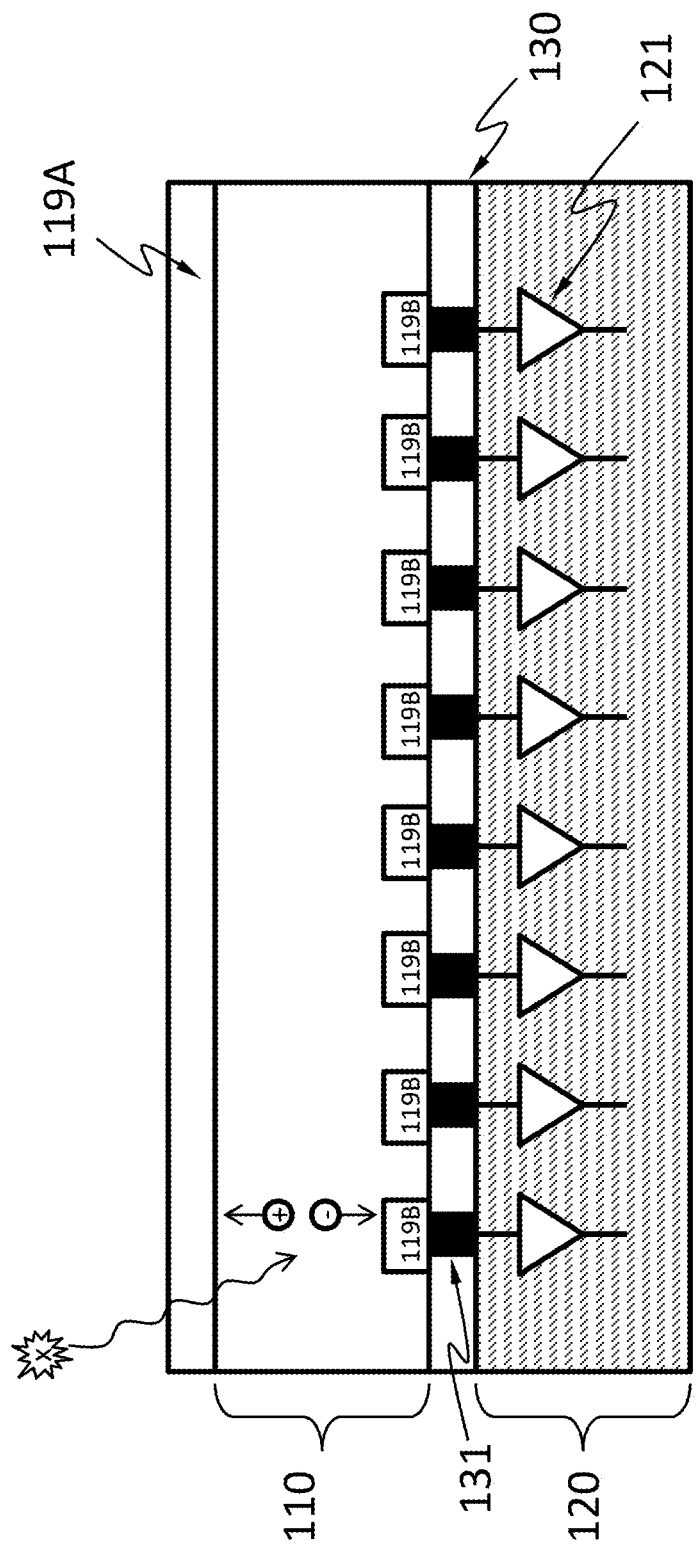
FIG. 1C schematically shows an alternative detailed cross-sectional view of the detector, according to an embodiment.

As shown in an alternative detailed cross-sectional view of the detector 100 in FIG. 1C, according to an embodiment, the X-ray absorption layer 110 may include a resistor of a semiconductor material such as, silicon, germanium, GaAs, CdTe, CdZnTe, or a combination thereof, but does not include a diode. The semiconductor may have a high mass attenuation coefficient for the X-ray energy of interest.

When an X-ray photon hits the X-ray absorption layer 110 including a resistor but not diodes, it may be absorbed and generate one or more charge carriers by a number of mechanisms. An X-ray photon may generate 10 to 100000 charge carriers. The charge carriers may drift to the electrical contacts 119A and 119B under an electric field. The field may be an external electric field. The electrical contact 119B includes discrete portions. In an embodiment, the charge carriers may drift in directions such that the charge carriers generated by a single X-ray photon are not substantially shared by two different discrete portions of the electrical contact 119B ("not substantially shared" here means less than 2%, less than 0.5%, less than 0.1%, or less than 0.01% of these charge carriers flow to a different one of the discrete portions than the rest of the charge carriers). Charge carriers generated by an X-ray photon incident around the footprint of one of these discrete portions of the electrical contact 119B are not substantially shared with another of these discrete portions of the electrical contact 119B. A pixel 150 associated with a discrete portion of the electrical contact 119B may be an area around the discrete portion in which substantially all (more than 98%, more than 99.5%, more than 99.9% or more than 99.99% of) charge carriers generated by an X-ray photon incident therein flow to the discrete portion of the electrical contact 119B. Namely, less than 2%, less than 0.5%, less than 0.1%, or less than 0.01% of these charge carriers flow beyond the pixel associated with the one discrete portion of the electrical contact 119B.

The electronics layer 120 may include an electronic system 121 suitable for processing or interpreting signals generated by X-ray photons incident on the X-ray absorption layer 110. The electronic system 121 may include an analog circuitry such as a filter network, amplifiers, integrators, and comparators, or a digital circuitry such as a microprocessors, and memory. The electronic system 121 may include components shared by the pixels or components dedicated to a single pixel. For example, the electronic system 121 may include an amplifier dedicated to each pixel and a microprocessor shared among all the pixels. The electronic system 121 may be electrically connected to the pixels by vias 131. Space among the vias may be filled with a filler material 130, which may increase the mechanical stability of the connection of the electronics layer 120 to the X-ray absorption layer 110. Other bonding techniques are possible to connect the electronic system 121 to the pixels without using vias.

Figure 2:
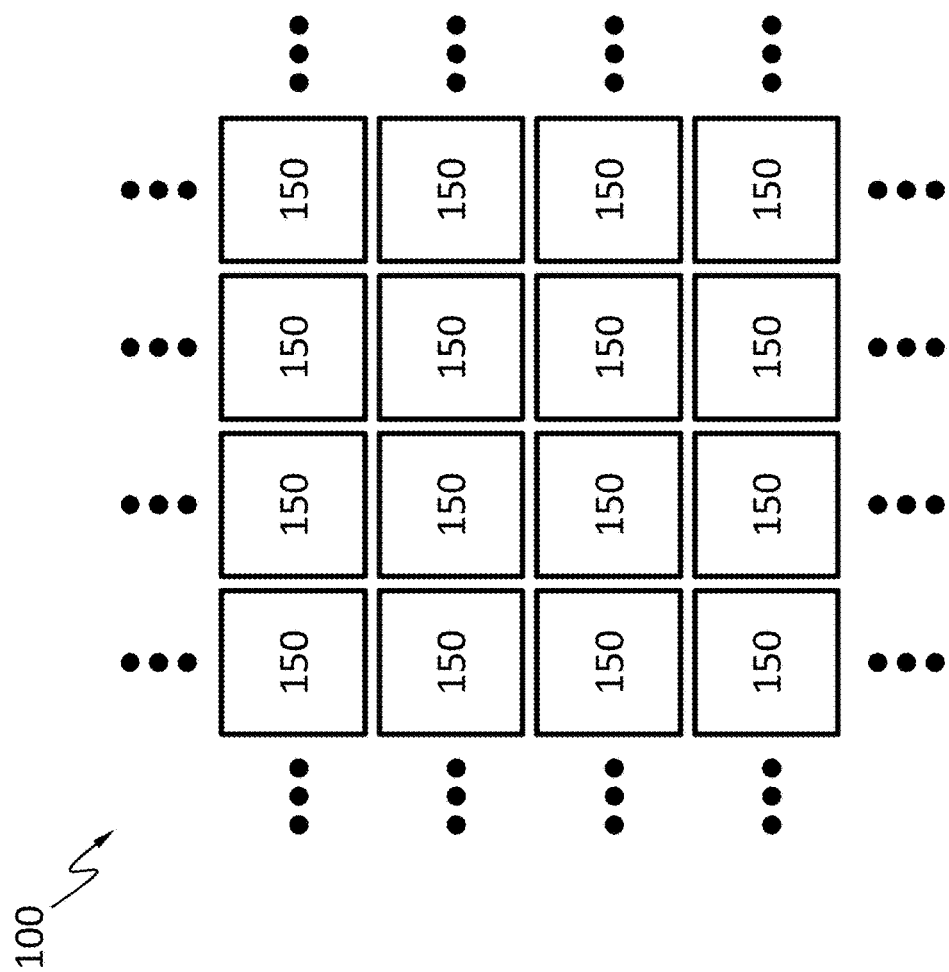
FIG. 2 schematically shows that the device may have an array of pixels, according to an embodiment.

FIG. 2 schematically shows that the detector 100 may have an array of pixels 150. The array may be a rectangular array, a honeycomb array, a hexagonal array or any other suitable array. Each pixel 150 may be configured to detect an X-ray photon incident thereon, measure the energy of the X-ray photon, or both. For example, each pixel 150 may be configured to count numbers of X-ray photons incident thereon whose energy falls in a plurality of bins, within a period of time. All the pixels 150 may be configured to count the numbers of X-ray photons incident thereon within a plurality of bins of energy within the same period of time. Each pixel 150 may have its own analog-to-digital converter (ADC) configured to digitize an analog signal representing the energy of an incident X-ray photon into a digital signal. The ADC may have a resolution of 10 bits or higher. Each pixel 150 may be configured to measure its dark current, such as before or concurrently with each X-ray photon incident thereon. Each pixel 150 may be configured to deduct the contribution of the dark current from the energy of the X-ray photon incident thereon. The pixels 150 may be configured to operate in parallel. For example, when one pixel 150 measures an incident X-ray photon, another pixel 150 may be waiting for an X-ray photon to arrive. The pixels 150 may be but do not have to be individually addressable.

Figure 3A:
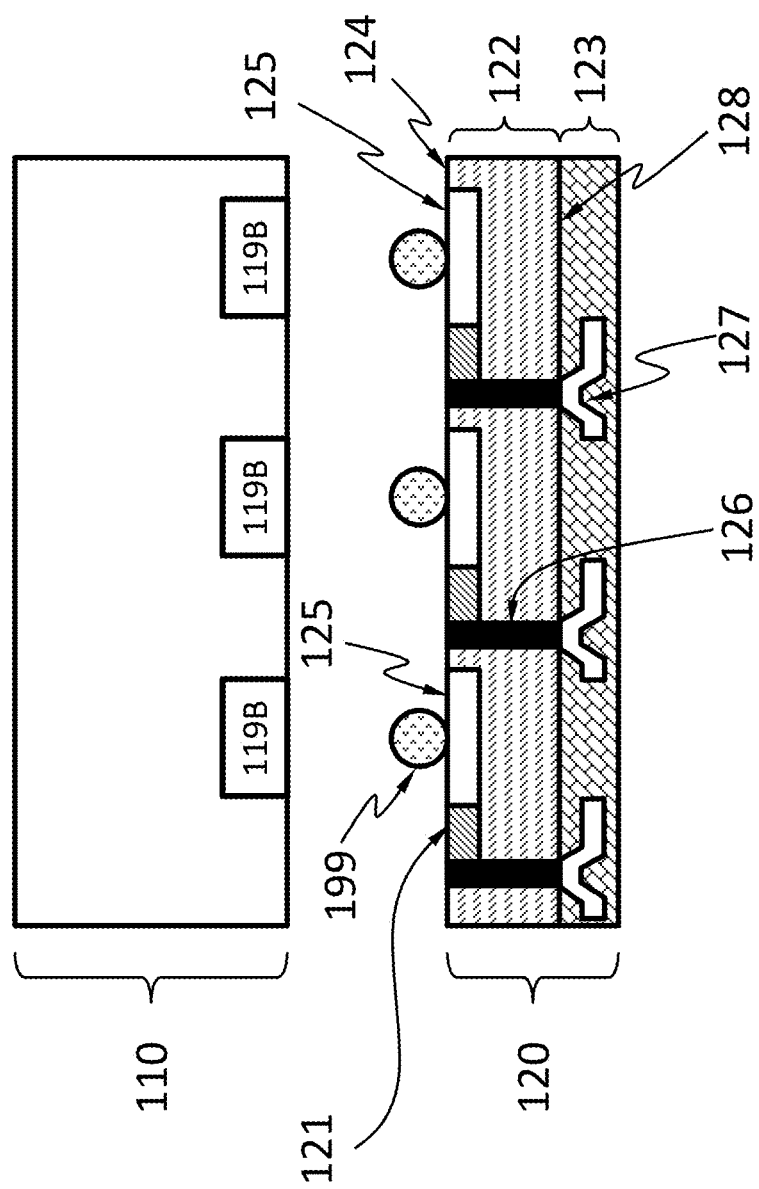
FIG. 3A schematically shows the electronics layer, according to an embodiment.

FIG. 3A schematically shows the electronics layer 120 according to an embodiment. The electronic layer 120 comprises a substrate 122 having a first surface 124 and a second surface 128. A "surface" as used herein is not necessarily exposed, but can be buried wholly or partially. The electronic layer 120 comprises one or more electric contacts 125 on the first surface 124. The one or more electric contacts 125 may be configured to be electrically connected to one or more electrical contacts 119B of the X-ray absorption layer 110. The electronics system 121 may be in or on the substrate 122. The electronic layer 120 comprises one or more vias 126 extending from the first surface 124 to the second surface 128. The electronic layer 120 comprises a redistribution layer (RDL) 123 on the second surface 128. The RDL 123 may comprise one or more transmission lines 127. The electronics system 121 is electrically connected to the electric contacts 125 and the transmission lines 127 through the vias 126.

The substrate 122 may be a thinned substrate. For example, the substrate may have at thickness of 750 microns or less, 200 microns or less, 100 microns or less, 50 microns or less, 20 microns or less, or 5 microns or less. The substrate 122 may be a silicon substrate or a substrate or other suitable semiconductor or insulator. The substrate 122 may be produced by grinding a thicker substrate to a desired thickness.

The one or more electric contacts 125 may be a layer of metal or doped semiconductor. For example, the electric contacts 125 may be gold, copper, platinum, palladium, doped silicon, etc.

The vias 126 pass through the substrate 122 and electrically connect electrical components (e.g., the electrical contacts 125) on the first surface 124 to electrical components (e.g., the RDL) on the second surface 128. The vias 126 are sometimes referred to as "through-silicon vias" although they may be fabricated in substrates of materials other than silicon.

The RDL 123 may comprise one or more transmission lines 127. The transmission lines 127 electrically connect electrical components (e.g., the vias 126) in the substrate 122 to bonding pads at other locations on the substrate 122. The transmission lines 127 may be electrically isolated from the substrate 122 except at certain vias 126 and certain bonding pads. The transmission lines 127 may be a material (e.g., Al) with small mass attenuation coefficient for the X-ray energy of interest. The RDL 123 may redistribute electrical connections to more convenient locations.

FIG. 3A further schematically shows bonding between the X-ray absorption layer 110 and the electronic layer 120 at the electrical contact 119B and the electrical contacts 125. The bonding may be by a suitable technique such as direct bonding or flip chip bonding.

Direct bonding is a wafer bonding process without any additional intermediate layers (e.g., solder bumps). The bonding process is based on chemical bonds between two surfaces. Direct bonding may be at elevated temperature but not necessarily so.

Flip chip bonding uses solder bumps 199 deposited onto contact pads (e.g., the electrical contact 119B of the X-ray absorption layer 110 or the electrical contacts 125). Either the X-ray absorption layer 110 or the electronic layer 120 is flipped over and the electrical contact 119B of the X-ray absorption layer 110 are aligned to the electrical contacts 125. The solder bumps 199 may be melted to solder the electrical contact 119B and the electrical contacts 125 together. Any void space among the solder bumps 199 may be filled with an insulating material.

Figure 3B:
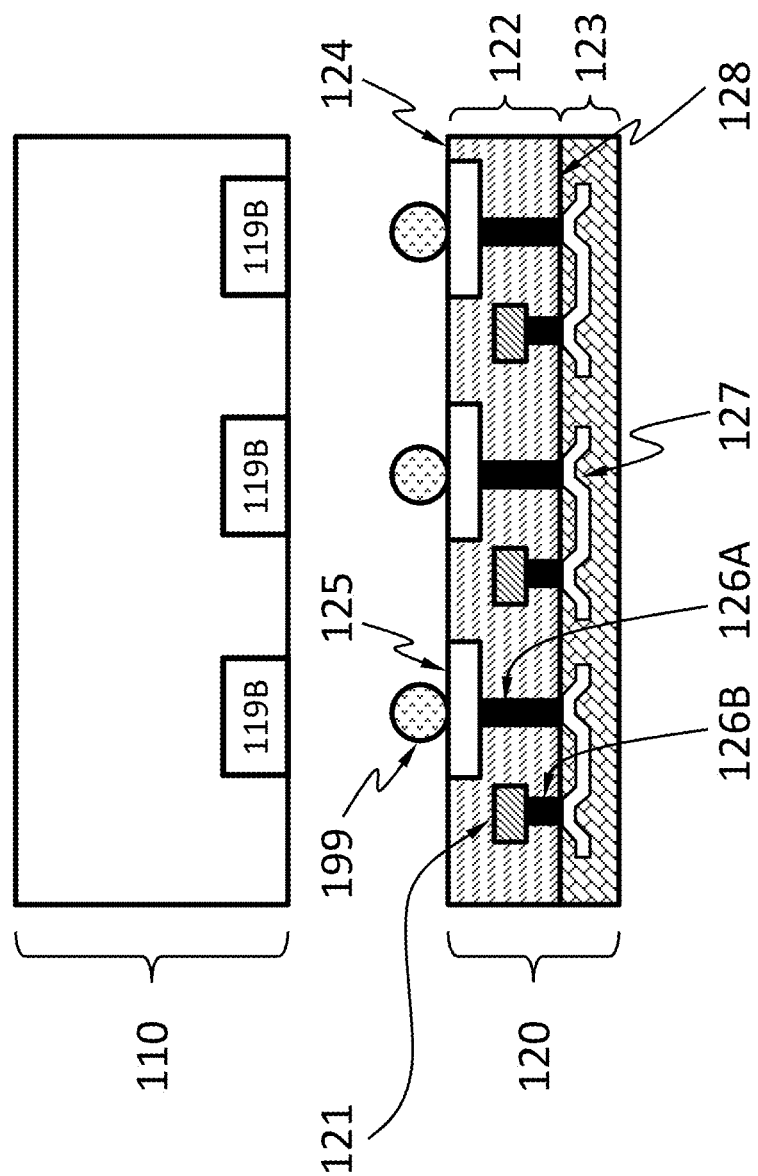
FIG. 3B schematically shows the electronics layer, according to an embodiment.

FIG. 3B schematically shows the electronics layer 120 according to an embodiment. The electronics layer 120 shown in FIG. 3B is different from the electronics layer 120 shown in FIG. 3A in the following ways. The electronics system 121 is buried in the substrate 122. The electronic layer 120 comprises one or more vias 126A extending from the first surface 124 to the second surface 128. The vias 126A electrically connect the electrical contacts 125 to the transmission lines 127 in the RDL 123 on the second surface 128. The electronic layer 120 further comprises one or more vias 126B extending from the second surface 128 to the electronics system 121. The vias 126B electrically connect the transmission lines 127 to the electronics system 121. The X-ray absorption layer 110 and the electronic layer 120 may also be bonded together (e.g., at the electrical contact 119B and the electrical contacts 125) by a suitable technique such as direct bonding or flip chip bonding.

The X-ray absorption layer 110 may include multiple discrete chips. Each of the chips may be bonded to the electronic layer 120 individually or collectively. The X-ray absorption layer 110 including multiple discrete chips may help to accommodate the difference between the thermal expansion coefficients of the materials of the X-ray absorption layer 110 and the electronic layer 120.

Figure 4A:
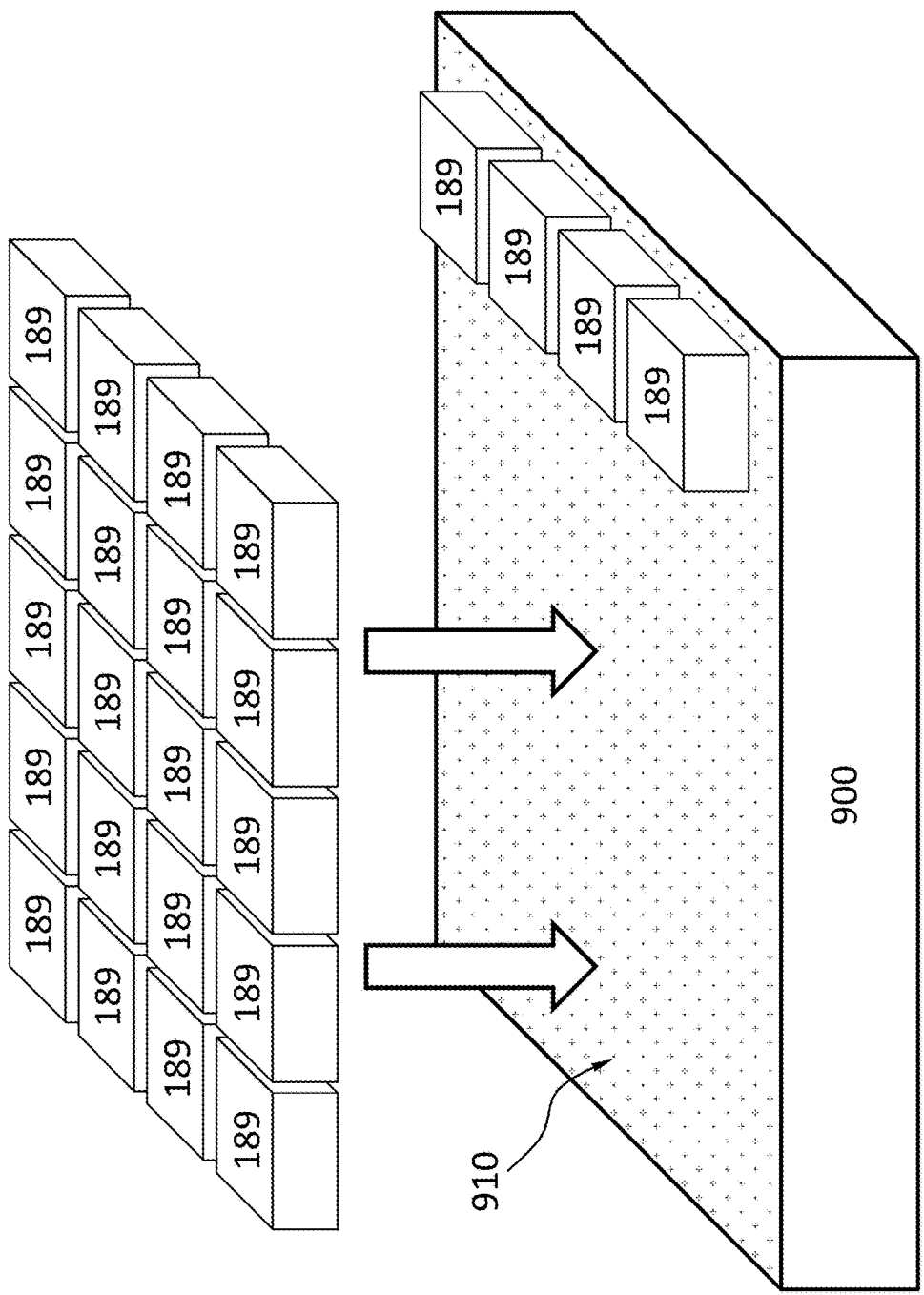
Figure 4B:
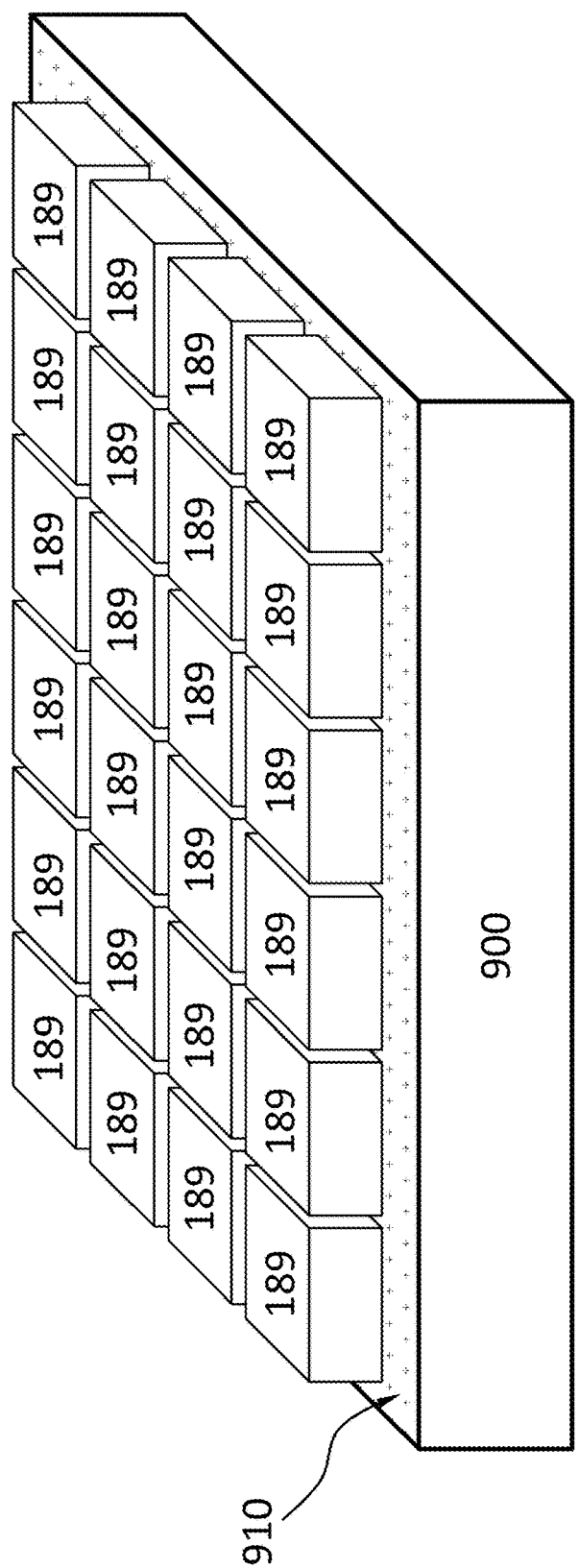

FIGS. 4A-4E schematically show a flow of making the detector 100, according to an embodiment. FIGS. 4A-4B schematically show that multiples chips 189 are attached to a surface 910 of a substrate 900. The X-ray absorption layer 110 will be fabricated from the chips 189. The substrate 900 may be a material that has a low (e.g., <1000 $m^2$/kg) mass attenuation coefficient for the X-ray energy of interest. Examples of such a material may include silicon, silicon oxide, Al, Cr, Ti, etc. The substrate 900 does not have to be a single material. In one example, the substrate 900 may include a body of silicon and the surface 910 may be a metal layer. In another example, the substrate 900 is a silicon wafer and the surface 910 is heavily doped silicon. The substrate 900 may have a sufficient strength to provide mechanical support to the chips 189 during subsequent fabrication processes. The surface 910 may be an electrically conductive material such as heavily doped silicon, Al, Cr, Ti, etc. The surface 910 may be configured to be electrically connected to or serve as the electrical contacts 119A of the X-ray absorption layer 110. The chips 189 may be attached to the substrate 900 one by one, altogether, column by column, row by row, or group by group. Alternatively, the chips 189 may be made from a wafer attached to the substrate 900.

FIG. 4C schematically shows that the chips 189 are thinned. The substrate 900 may have a sufficient strength to provide mechanical support to the chips 189 during thinning. One way to thin the chips 189 is grinding. The chips 189 may be thinned to 200 microns thick or less, 100 microns thick or less or 50 microns thick or less. Smaller thickness reduces the chance that the charge carriers are trapped by defects (e.g., EL2 defects in GaAs) in the chips 189 and thus increases the charge collection efficiency (CCE) by the electronic system 121.

Figure 4D:
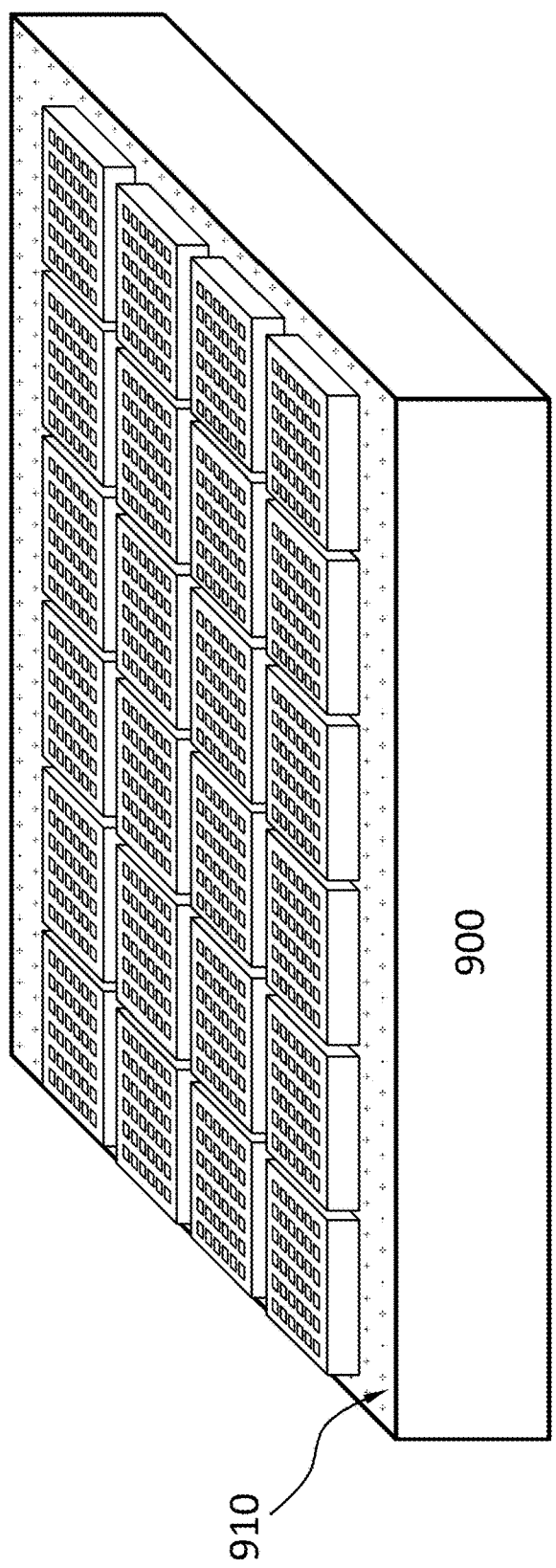

FIG. 4D schematically shows that various structures (e.g., diodes with the discrete regions 114, electrical contact 119B, etc.) are made in the chips 189.

Figure 4E:
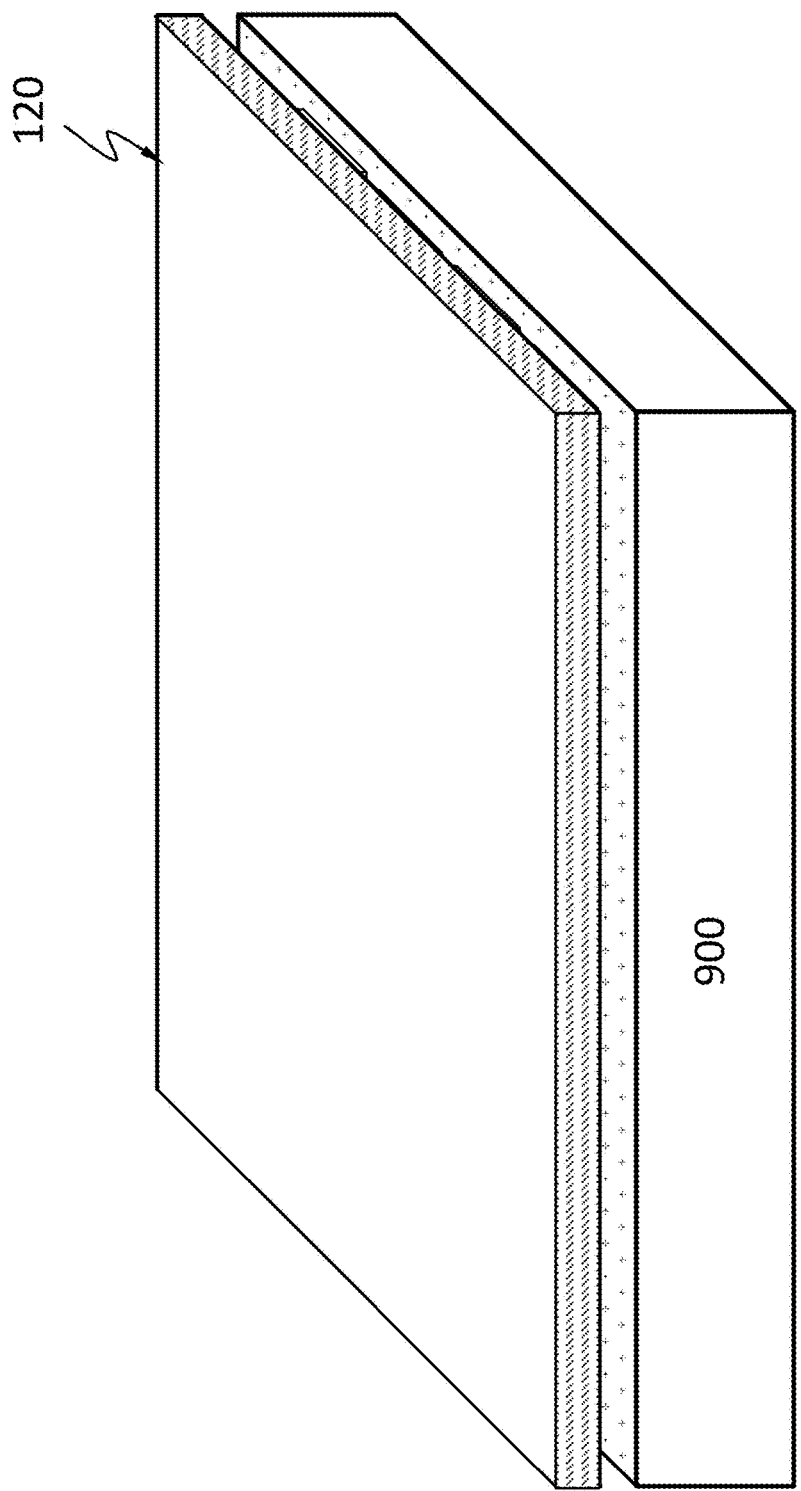

FIG. 4E schematically shows that the electronics layer 120 is attached to the chips 189 to complete the detector 100. The substrate 122 of the electronic layer 120 may have multiple electric contacts 125 on the first surface 124 as shown in FIG. 3A and FIG. 3B. The multiple electric contacts 125 may be in electrical contact with the electrical contacts 119B.

FIG. 4E shows that the chips 189 may be bonded to the substrate 122 using a suitable bonding method such as flip chip bonding or directing bonding as shown in FIG. 3A and FIG. 3B. The electrode of each of the chips 189 is electrically connected to at least one of the electrical contacts 125. The gap between two neighboring chips 189, after the chips 189 are bonded to the substrate 122, may be 100 microns or less. The chips 189 may be arranged as an array after being bonded to the substrate 122. The smaller sizes of the chips 189 relative to the substrate 122 may help accommodating the difference in thermal expansion coefficients of the chips 189 and the substrate 122. A ratio between the thermal expansion coefficient of the chips 189 and the thermal expansion coefficient of the substrate 122 may be two or more. The X-ray absorption layer in the chips 189 may be 200 microns thick or less, 100 microns thick or less or 50 microns thick or less. Smaller thickness of the X-ray absorption layer reduces the chance that the charge carriers are trapped by defects in the X-ray absorption layer and thus increases the charge collection efficiency (CCE) by the electronic system 121. The X-ray absorption layer in the chips 189 may be a material doped with chromium, especially when the material is GaAs. Chromium doping in GaAs may reduce the concentration of EL2 defects in GaAs and thus allows higher thickness of the X-ray absorption layer (thus higher absorption efficiency) without losing too many charge carriers to defects. Conversely, a small thickness of GaAs allows omission of chromium doping. The substrate 122 may have vias or an RDL shown in FIG. 3A or FIG. 3B.

The substrate 900 does not have to be removed from the chips 189, even after bonding the electronic layer 120.

Figure 5A:
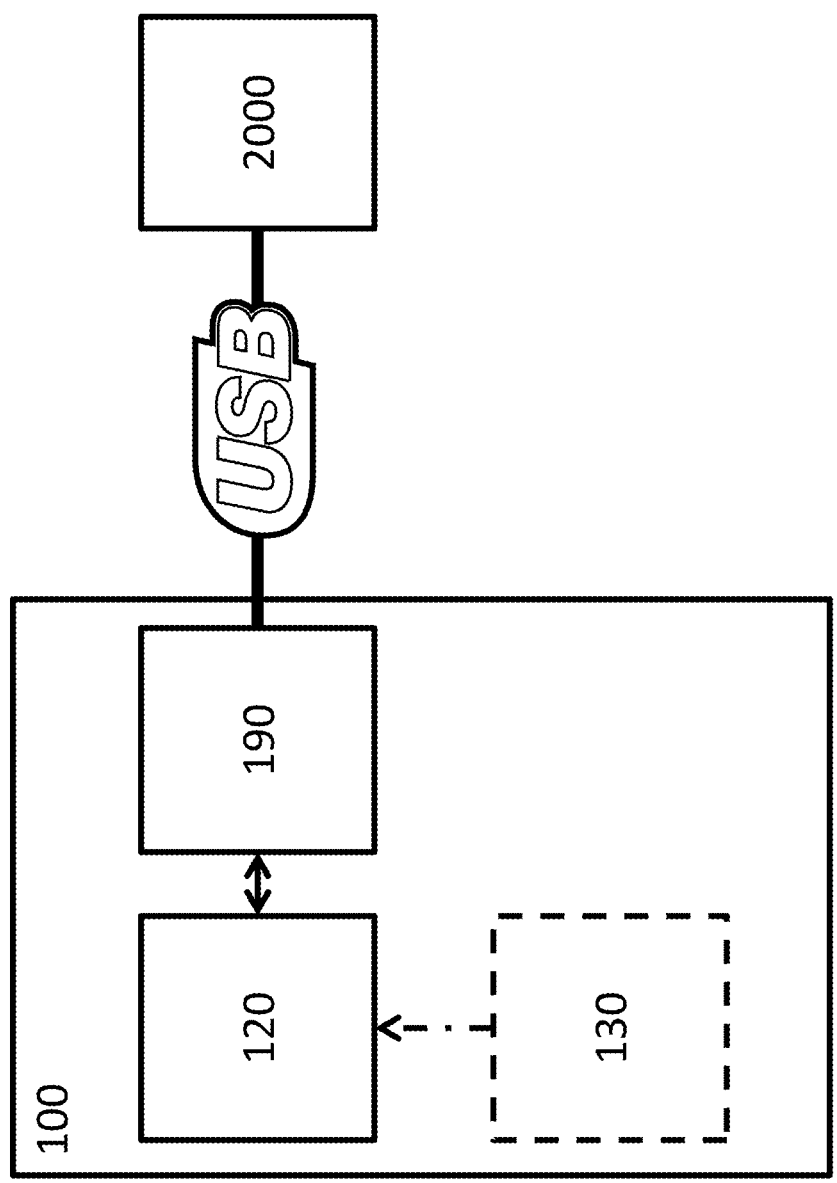
FIG. 5A schematically shows a function block diagram of the electronics of the detector, according to an embodiment.

FIG. 5A schematically shows a function block diagram of the electronics of the detector 100, according to an embodiment. The electronics of detector 100 may include the high voltage circuit 130 and the circuitry in the electronic layer 120 and a communication module 190. Data and control signals may be transmitted between the electronic layer 120 and the communication module 190. The communication module 190 may be configured to communicate with a computer 2000 through a protocol such as the Universal Serial Bus (USB). The computer may control and power the detector 100.

Figure 5B:
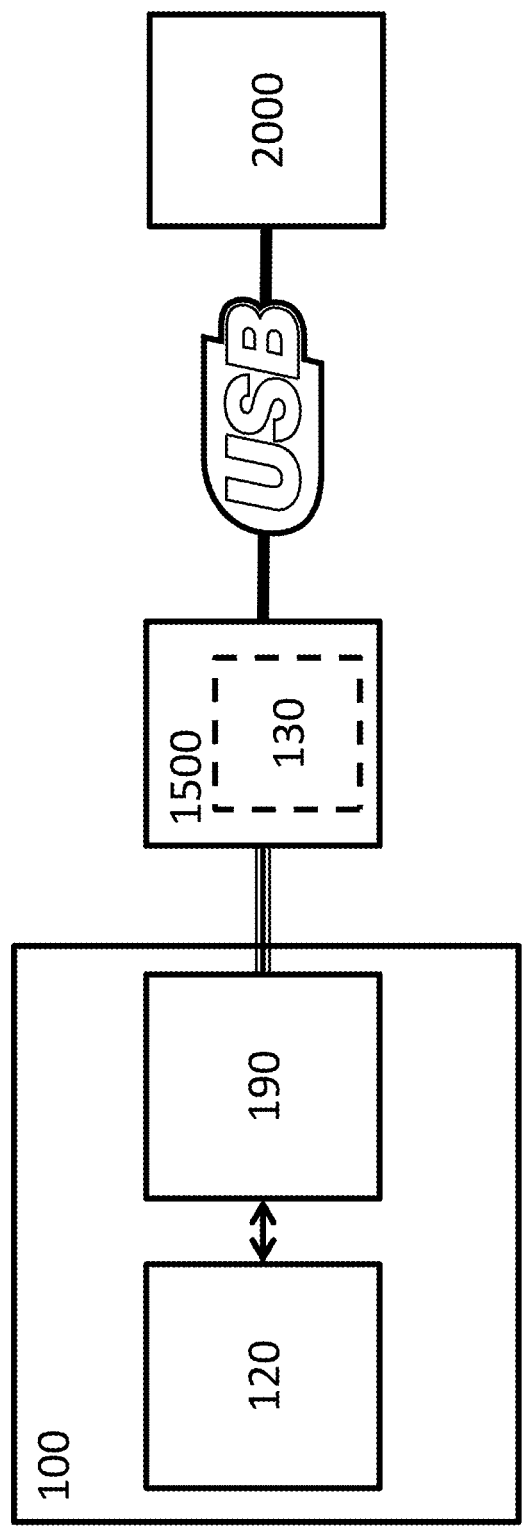
FIG. 5B schematically shows a function block diagram of the electronics of the detector, according to an embodiment.

FIG. 5B schematically shows a function block diagram of the electronics of the detector 100, according to an embodiment. The electronics of detector 100 may include the circuitry in the electronic layer 120 and a communication module 190. Data and control signals may be transmitted between the electronic layer 120 and the communication module 190. The communication module 190 may be configured to communicate with a computer 2000 through an interface module 1500. The interface module 1500 may include the high voltage circuit 130 powered by the computer and an optional battery in the interface module 1500. The interface module may communicated with the computer 2000 through a protocol such as the Universal Serial Bus (USB). The interface module 1500 may communicate with computer wirelessly. The computer may control or power the detector 100 through the interface module 1500. The interface module 1500 may be powered by a battery or by other types of power supply.

FIG. 5C schematically shows a function block diagram of the electronics of the detector 100, according to an embodiment. The electronics of detector 100 may include the high voltage circuit 130, the circuitry in the electronic layer 120, a battery 140 and a communication module 190. Data and control signals may be transmitted between the electronic layer 120 and the communication module 190. The battery 140 may provide power to the electronic layer 120, the high voltage circuit 130 and the communication module 190. The communication module 190 may be configured to communicate wirelessly with a computer 2000.

FIG. 6A and FIG. 6B schematically show that the thickness of the X-ray absorption layer 110 may not be entirely uniform. The non-uniformity may be a result of thinning. The non-uniformity in thickness leads to non-uniformity in the absorptance of X-ray photons. The thickness may vary linearly with position. Namely, the upper and lower surfaces of the X-ray absorption layer 110 are both planes but are not parallel to each other. Therefore, the thickness at each location of the X-ray absorption layer 110 can be determined from the thicknesses at three locations not on a straight line. The thickness at a location is proportional to the dark current at that location.

Figure 7A:
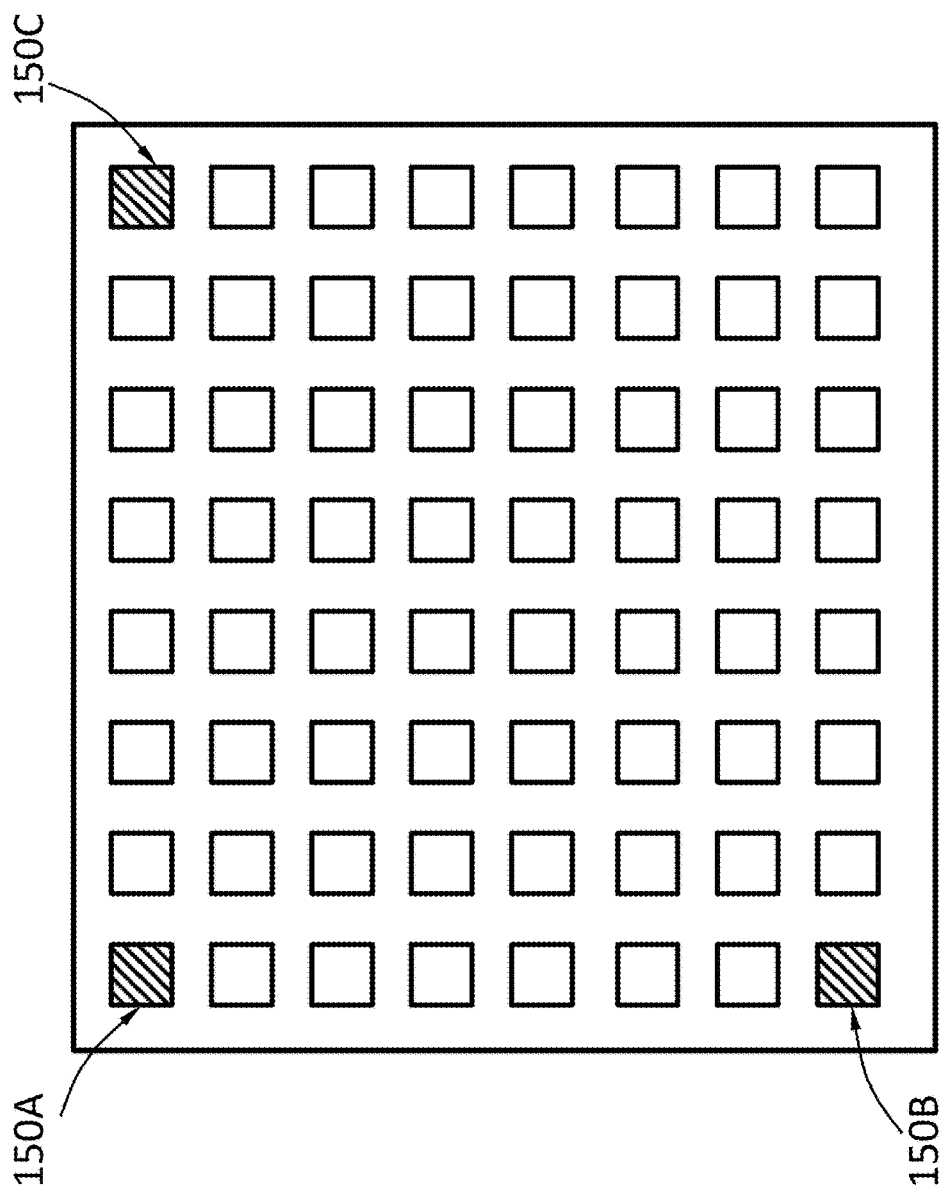
FIG. 7A schematically shows that three of the pixels may be used to measure the dark currents at these pixels.

FIG. 7A schematically shows that three pixels 150A, 150B and 150C may be used to measure the dark currents at these pixels.

Figure 7B:
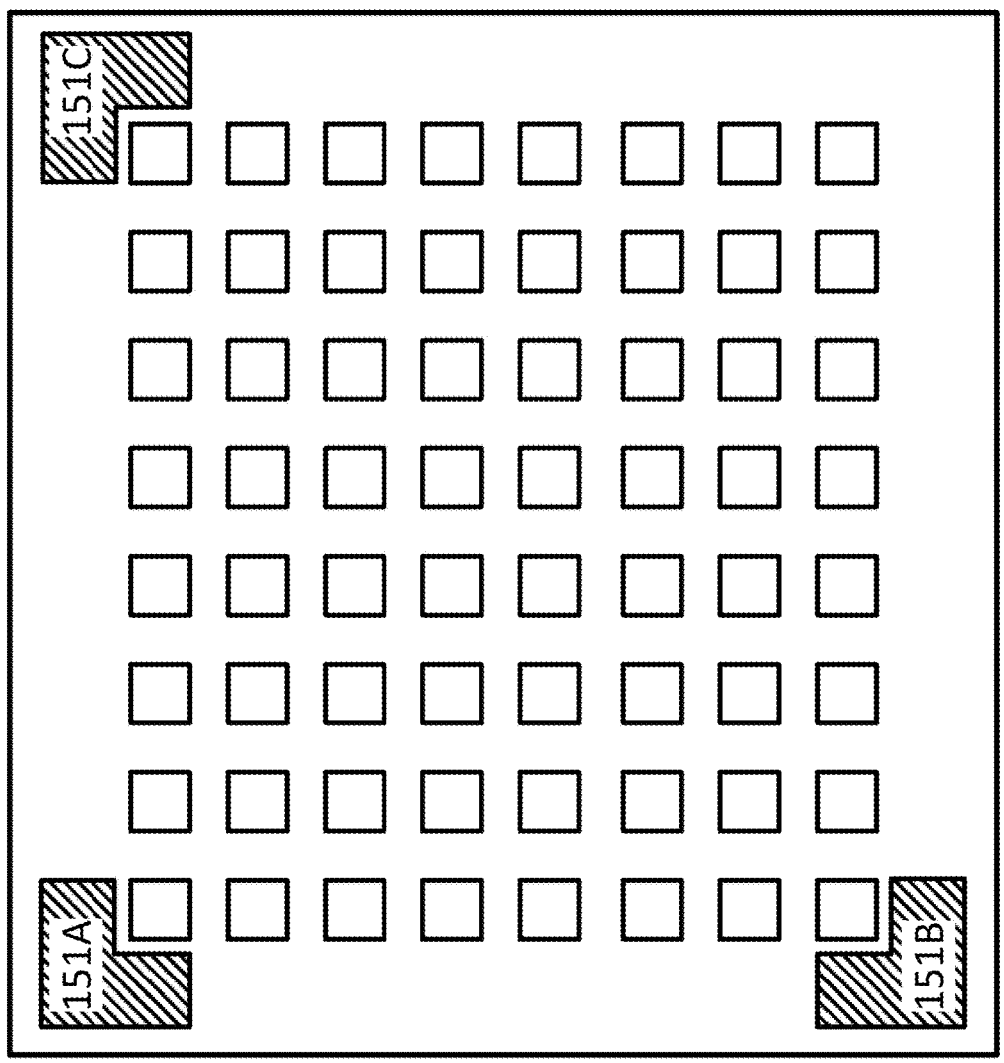
FIG. 7B schematically shows that three special dark current measurement circuits may be disposed in the detector to measure the dark currents at these locations.

FIG. 7B schematically shows that three special dark current measurement circuits 151A, 151B and 151C may be disposed in the detector 100. The dark current measurement circuits 151A, 151B and 151C can measure the dark currents at their locations. The dark current measurement circuits 151A, 151B and 151C may be bigger in area than the pixels to reduce the noise in the dark current measurement.

Alternatively, all the pixels 150 may measure the dark currents at their locations and the measured dark currents may be used to determine a thickness profile (i.e., thickness as a function of location). This approach would not assume that the thickness variation is linear.

Figure 8:
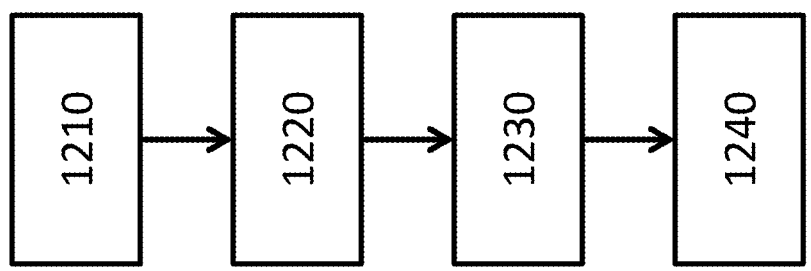
FIG. 8 shows a flow chart for a method to measure an intensity distribution of X-ray using an X-ray detector such as the detector disclosed herein.

FIG. 8 shows a flow chart for a method to measure an intensity distribution of X-ray using an X-ray detector such as the detector 100 disclosed herein. In 1210, determine values of dark current at at least three locations on the X-ray detector. The three locations are not on a straight line. For example, the values of the dark current may be determined at three pixels of the detector 100 as shown in FIG. 7A. In 1220, determine a spatial variation of absorptance of the X-ray using the values of the dark current. The spatial variation of absorptance may be linear with respect to location. The spatial variation of absorptance may be caused by thickness variation of the X-ray absorption layer of the X-ray detector, as shown in FIGS. 6A and 6B. In 1230, measure an apparent intensity distribution of the X-ray. In 1240, determine the intensity distribution by removing a contribution of the spatial variation the absorptance from the apparent intensity distribution.

Figure 9:
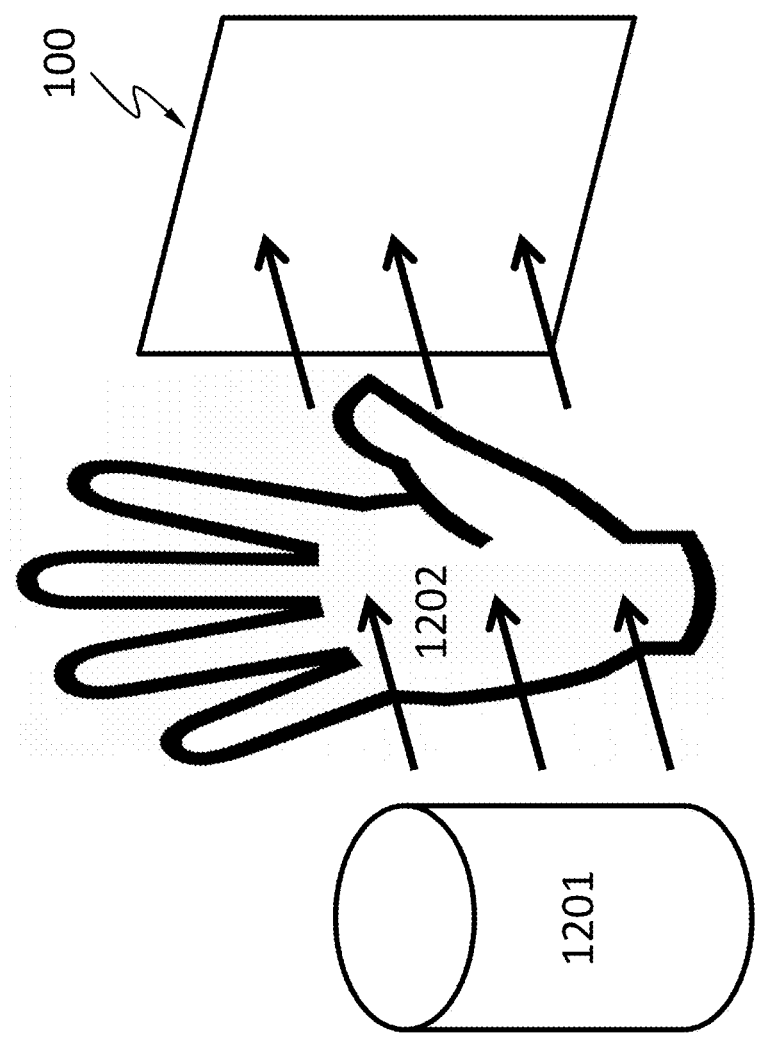
FIG. 9 schematically shows a system comprising the semiconductor X-ray detector described herein, suitable for medical imaging such as chest X-ray radiography, abdominal X-ray radiography, etc., according to an embodiment FIG. 10 schematically shows a system comprising the semiconductor X-ray detector described herein suitable for dental X-ray radiography, according to an embodiment.

FIG. 9 schematically shows a system comprising the semiconductor X-ray detector 100 described herein. The system may be used for medical imaging such as chest X-ray radiography, abdominal X-ray radiography, etc. The system comprises an X-ray source 1201. X-ray emitted from the X-ray source 1201 penetrates an object 1202 (e.g., a human body part such as chest, limb, abdomen), is attenuated by different degrees by the internal structures of the object 1202 (e.g., bones, muscle, fat and organs, etc.), and is projected to the semiconductor X-ray detector 100. The semiconductor X-ray detector 100 forms an image by detecting the intensity distribution of the X-ray.

Figure 10:
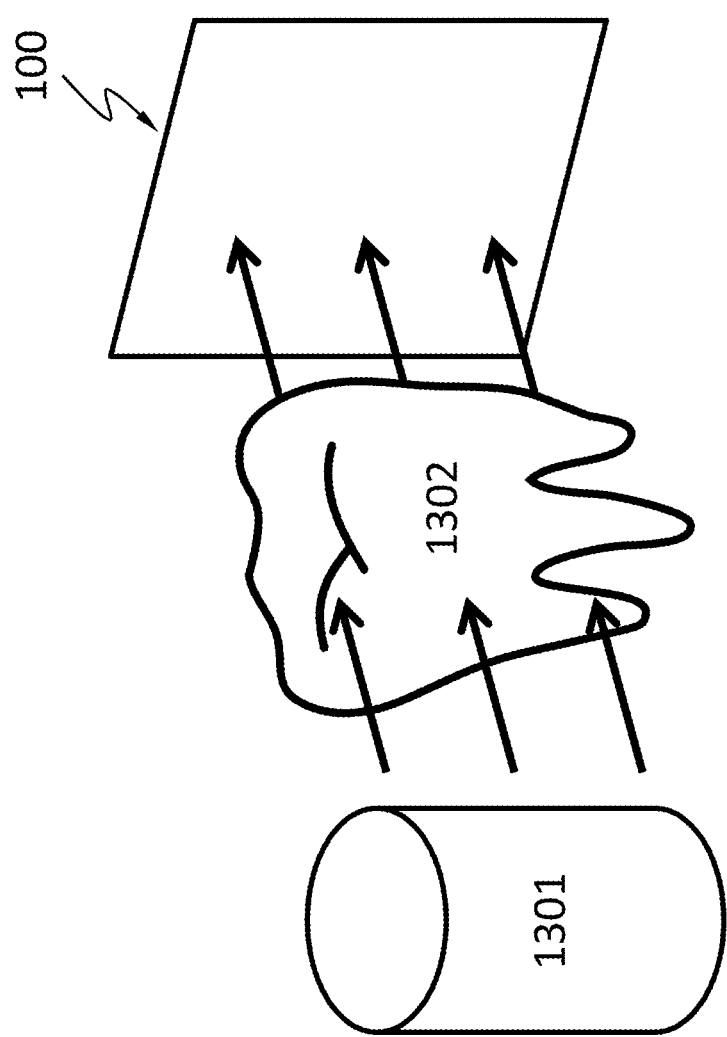

FIG. 10 schematically shows a system comprising the semiconductor X-ray detector 100 described herein. The system may be used for medical imaging such as dental X-ray radiography. The system comprises an X-ray source 1301. X-ray emitted from the X-ray source 1301 penetrates an object 1302 that is part of a mammal (e.g., human) mouth. The object 1302 may include a maxilla bone, a palate bone, a tooth, the mandible, or the tongue. The X-ray is attenuated by different degrees by the different structures of the object 1302 and is projected to the semiconductor X-ray detector 100. The semiconductor X-ray detector 100 forms an image by detecting the intensity distribution of the X-ray. Teeth absorb X-ray more than dental caries, infections, periodontal ligament. The dosage of X-ray radiation received by a dental patient is typically small (around 0.150 mSv for a full mouth series).

Figure 11:
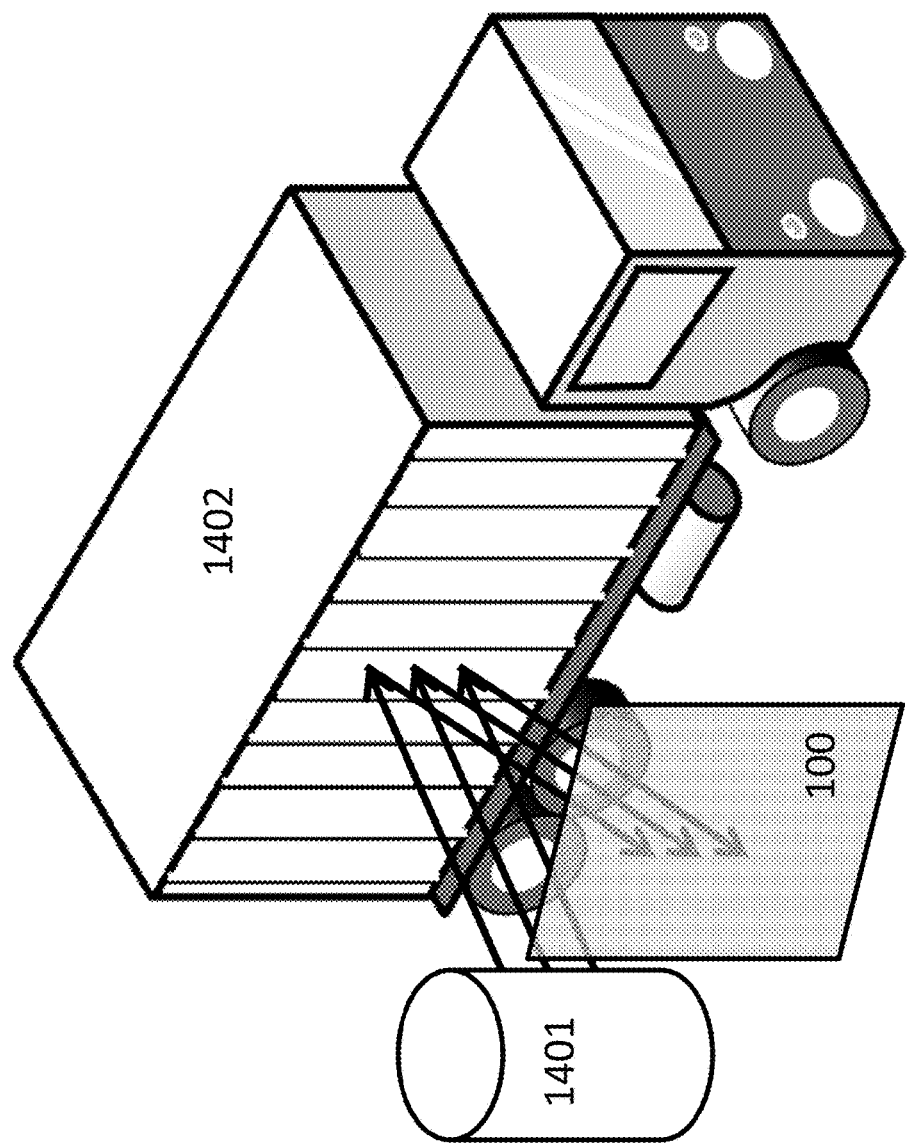
FIG. 11 schematically shows a cargo scanning or non-intrusive inspection (NII) system comprising the semiconductor X-ray detector described herein, according to an embodiment.

FIG. 11 schematically shows a cargo scanning or non-intrusive inspection (NII) system comprising the semiconductor X-ray detector 100 described herein. The system may be used for inspecting and identifying goods in transportation systems such as shipping containers, vehicles, ships, luggage, etc. The system comprises an X-ray source 1401. X-ray emitted from the X-ray source 1401 may backscatter from an object 1402 (e.g., shipping containers, vehicles, ships, etc.) and be projected to the semiconductor X-ray detector 100. Different internal structures of the object 1402 may backscatter X-ray differently. The semiconductor X-ray detector 100 forms an image by detecting the intensity distribution of the backscattered X-ray and/or energies of the backscattered X-ray photons.

Figure 12:
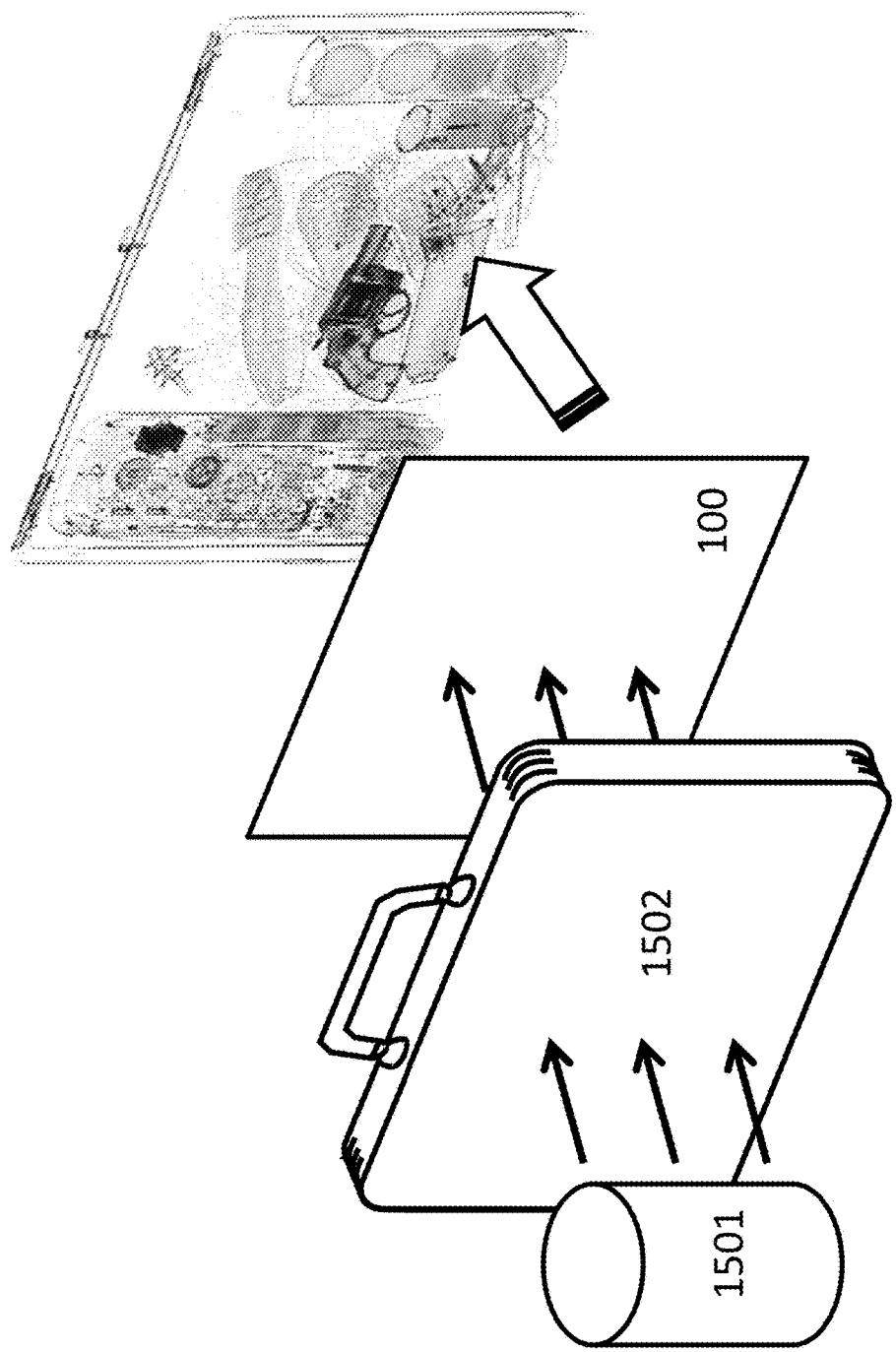
FIG. 12 schematically shows another cargo scanning or non-intrusive inspection (NII) system comprising the semiconductor X-ray detector described herein, according to an embodiment.

FIG. 12 schematically shows another cargo scanning or non-intrusive inspection (NII) system comprising the semiconductor X-ray detector 100 described herein. The system may be used for luggage screening at public transportation stations and airports. The system comprises an X-ray source 1501. X-ray emitted from the X-ray source 1501 may penetrate a piece of luggage 1502, be differently attenuated by the contents of the luggage, and projected to the semiconductor X-ray detector 100. The semiconductor X-ray detector 100 forms an image by detecting the intensity distribution of the transmitted X-ray. The system may reveal contents of luggage and identify items forbidden on public transportation, such as firearms, narcotics, edged weapons, flammables.

Figure 13:
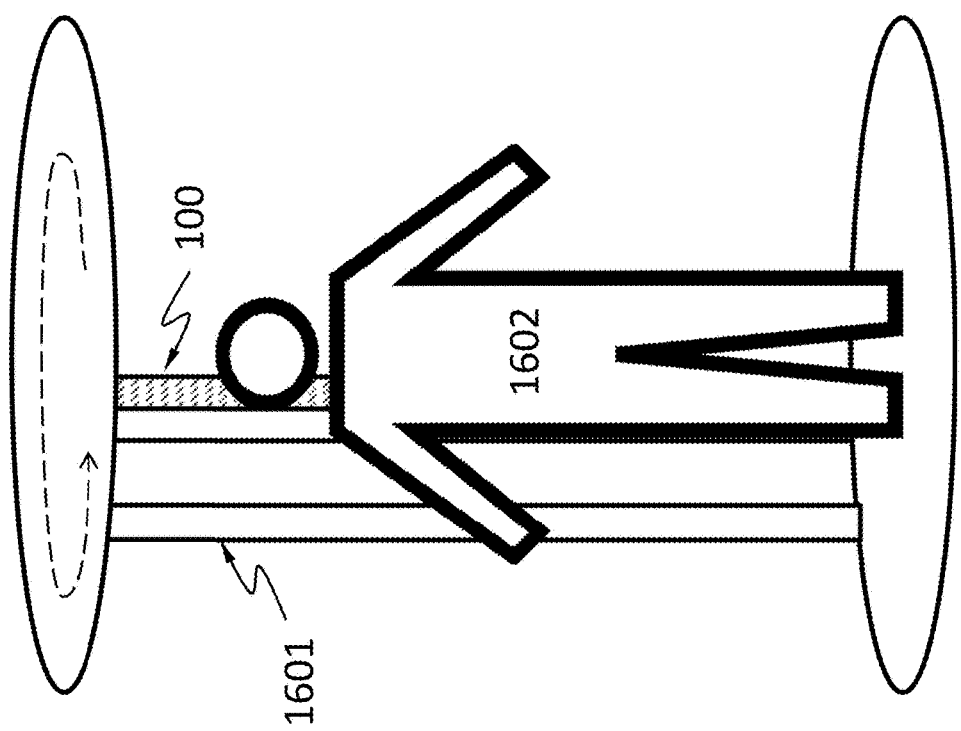
FIG. 13 schematically shows a full-body scanner system comprising the semiconductor X-ray detector described herein, according to an embodiment.

FIG. 13 schematically shows a full-body scanner system comprising the semiconductor X-ray detector 100 described herein. The full-body scanner system may detect objects on a person's body for security screening purposes, without physically removing clothes or making physical contact. The full-body scanner system may be able to detect non-metal objects. The full-body scanner system comprises an X-ray source 1601. X-ray emitted from the X-ray source 1601 may backscatter from a human 1602 being screened and objects thereon, and be projected to the semiconductor X-ray detector 100. The objects and the human body may backscatter X-ray differently. The semiconductor X-ray detector 100 forms an image by detecting the intensity distribution of the backscattered X-ray. The semiconductor X-ray detector 100 and the X-ray source 1601 may be configured to scan the human in a linear or rotational direction.

Figure 14:
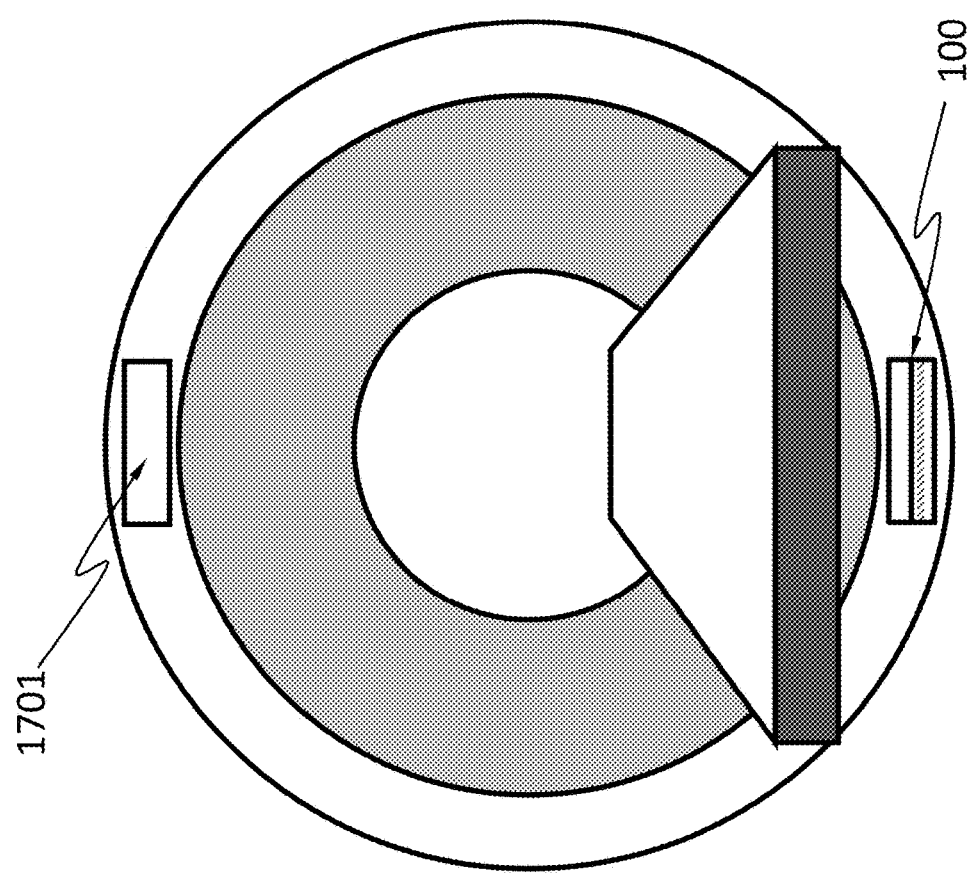
FIG. 14 schematically shows an X-ray computed tomography (X-ray CT) system comprising the semiconductor X-ray detector described herein, according to an embodiment.

FIG. 14 schematically shows an X-ray computed tomography (X-ray CT) system. The X-ray CT system uses computer-processed X-rays to produce tomographic images (virtual "slices") of specific areas of a scanned object. The tomographic images may be used for diagnostic and therapeutic purposes in various medical disciplines, or for flaw detection, failure analysis, metrology, assembly analysis and reverse engineering. The X-ray CT system comprises the semiconductor X-ray detector 100 described herein and an X-ray source 1701. The semiconductor X-ray detector 100 and the X-ray source 1701 may be configured to rotate synchronously along one or more circular or spiral paths.

Figure 15:
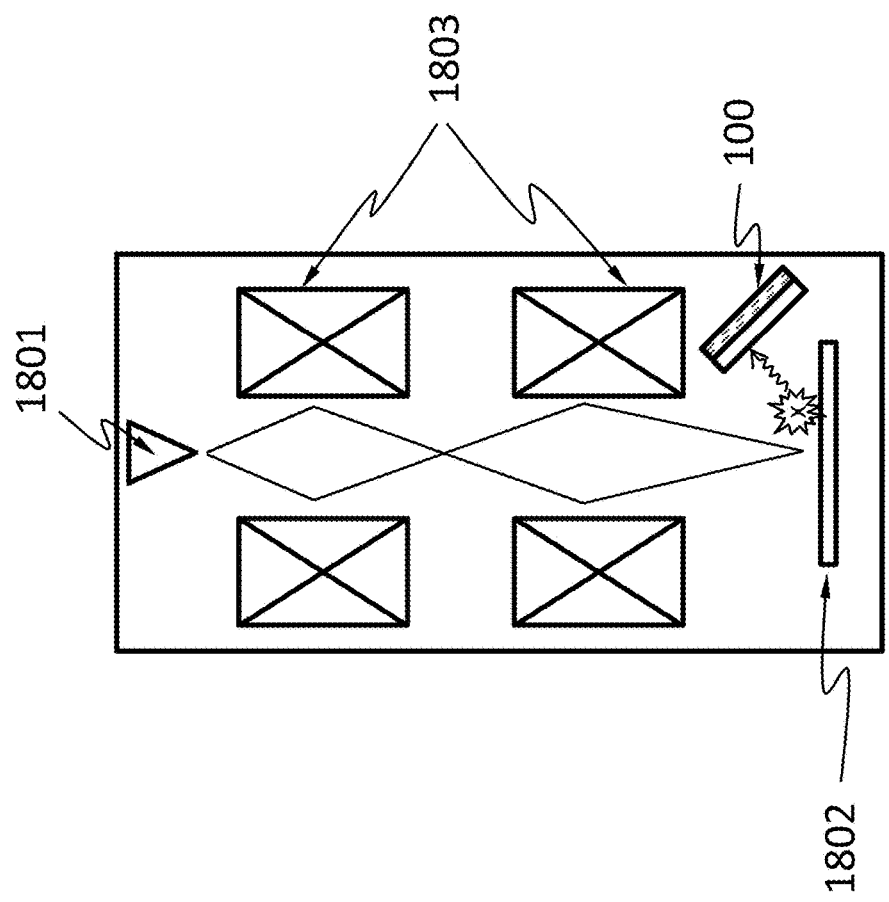
FIG. 15 schematically shows an electron microscope comprising the semiconductor X-ray detector described herein, according to an embodiment.

FIG. 15 schematically shows an electron microscope. The electron microscope comprises an electron source 1801 (also called an electron gun) that is configured to emit electrons. The electron source 1801 may have various emission mechanisms such as thermionic, photocathode, cold emission, or plasmas source. The emitted electrons pass through an electronic optical system 1803, which may be configured to shape, accelerate, or focus the electrons. The electrons then reach a sample 1802 and an image detector may form an image therefrom. The electron microscope may comprise the semiconductor X-ray detector 100 described herein, for performing energy-dispersive X-ray spectroscopy (EDS). EDS is an analytical technique used for the elemental analysis or chemical characterization of a sample. When the electrons incident on a sample, they cause emission of characteristic X-rays from the sample. The incident electrons may excite an electron in an inner shell of an atom in the sample, ejecting it from the shell while creating an electron hole where the electron was. An electron from an outer, higher-energy shell then fills the hole, and the difference in energy between the higher-energy shell and the lower energy shell may be released in the form of an X-ray. The number and energy of the X-rays emitted from the sample can be measured by the semiconductor X-ray detector 100.

The semiconductor X-ray detector 100 described here may have other applications such as in an X-ray telescope, X-ray mammography, industrial X-ray defect detection, X-ray microscopy or microradiography, X-ray casting inspection, X-ray non-destructive testing, X-ray weld inspection, X-ray digital subtraction angiography, etc. It may be suitable to use this semiconductor X-ray detector 100 in place of a photographic plate, a photographic film, a PSP plate, an X-ray image intensifier, a scintillator, or another semiconductor X-ray detector.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to measure an intensity distribution of X-ray using an X-ray detector, the method comprising:
   determining values of dark current at at least three locations on the X-ray detector, wherein the three locations are not on a straight line;
   determining a spatial variation of absorptance of the X-ray using the values of the dark current;
   measuring an apparent intensity distribution of the X-ray;
   determining the intensity distribution by removing a contribution of the spatial variation the absorptance from the apparent intensity distribution;
   wherein the spatial variation of absorptance is caused by thickness variation of an X-ray absorption layer of the X-ray detector.

2. The method of claim 1, wherein determining values of the dark current is at three pixels of the X-ray detector.

3. The method of claim 1, wherein the spatial variation of absorptance is linear with respect to location.

* * * * *